Sept. 11, 1962 P. H. BRONNENKANT ET AL 3,052,925
METHOD OF QUICKLY FILLING A MOLD CAVITY
WITH THERMOPLASTIC MATERIAL
Filed June 7, 1956 4 Sheets-Sheet 3

INVENTORS
PAUL H. BRONNENKANT
CHARLES M. FERREE
BY
Bean, Brooks, Buckley & Bean
ATTORNEYS 3,052,925
METHOD OF QUICKLY FILLING A MOLD CAVITY WITH THERMOPLASTIC MATERIAL
Paul H. Bronnenkant, 803 Hopkins Road, Williamsville, N.Y., and Charles M. Ferree, R.F.D. 6, Lockport, N.Y.
Filed June 7, 1956, Ser. No. 590,030
1 Claim. (Cl. 18—55)

Our invention relates in general to the molding of thermoplastic materials, and in particular to a device for and a method of molding such materials by injection. It is well known to those skilled in the art, that the manufacture of plastic articles by the injection molding method has been somewhat limited with regard to the molding of thin sections having any appreciable area. A thin section within the plastics industry is generally classified as one having a thickness of 1/32" or less. The problems encountered in attempting to mold any usable object with extremely thin walls are the difficulty in maintaining the plasticity or "flowability" of the material for the time required to fill the mold cavity, and the difficulty in attaining sufficient speed of injection to fill the mold cavity before flowability is diminished.

Attempts have been made to successfully mold thin sections by increasing the flowability of the plastic and by increasing the speed of injection but such efforts require additional power input or mechanical advantage through the use of additional or auxiliary devices, thereby not only increasing the cost of equipment and manufacture; but, under such conditions high molecular orientation occurs, frequently resulting in cracking of the finished product in the line of flow of the plastic. Furthermore, due to the compressibility of thermoplastic material in its plasticized or molten state, what is known as packing occurs, whereby excess amounts of material may be packed into the mold cavity as a whole or in isolated portions thereof which causes constant pressure and strain on the finished molded article ultimately resulting in a weakened structure.

Due, however, to the unique characteristics of being compressible, thermoplastic materials have a high degree of elasticity, and are capable of storing up a great deal of energy under compression.

The principal object of our invention is, therefore, to attain the desired injection velocity by harnessing the elasticity of the plastic material itself, by alternately compressing and releasing it under controlled conditions.

Another object is to provide a valve in the injection nozzle which temporarily closes the nozzle during the compression period of the process.

Other objects are to periodically restrain the flow of plastic material under pressure, to temporarily hold the material in a state of compression to a volume less than that at atmospheric pressure, and to instantaneously release the material under pressure into the mold.

A further object is to provide an apparatus simple in construction, of low initial cost and one which does not increase the cost of operation.

Moreover, our apparatus will operate on relatively low pressure with less need for accurate temperature control, and with faster overall operation.

Furthermore, our process makes possible the molding of very difficult shapes as well as the molding of some shapes heretofore impossible to make. Moreover, our process substantially reduces molecular orientation and internal strain, and generally improves the appearance and stability of non-uniform sections.

The above objects and advantages have been accomplished by the device shown in the accompanying drawings, of which:

Figure 1:
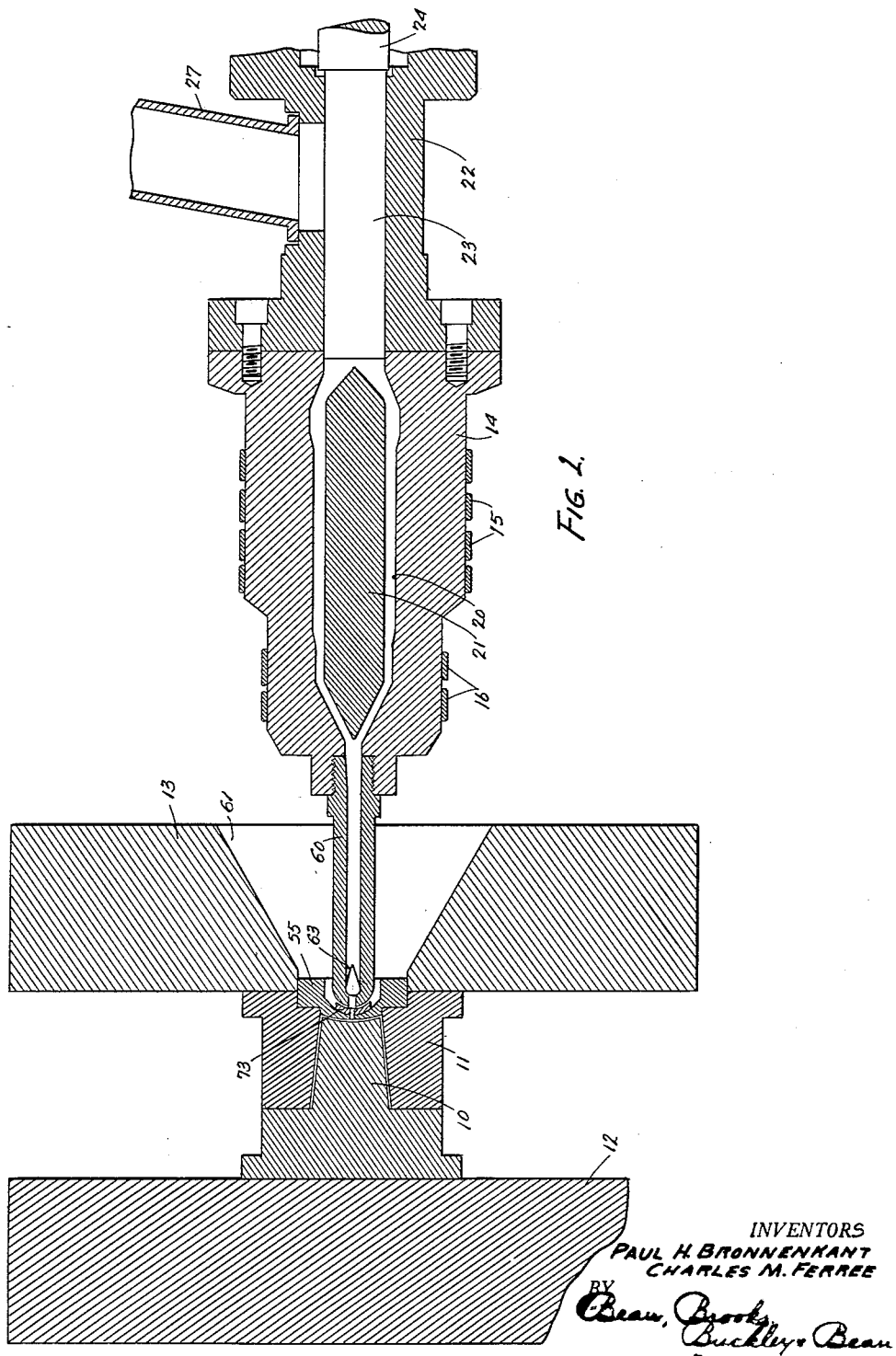
FIG. 1 is a longitudinal sectional view, somewhat schematic, of a portion of an injection molding apparatus equipped with our invention.
Figure 2:
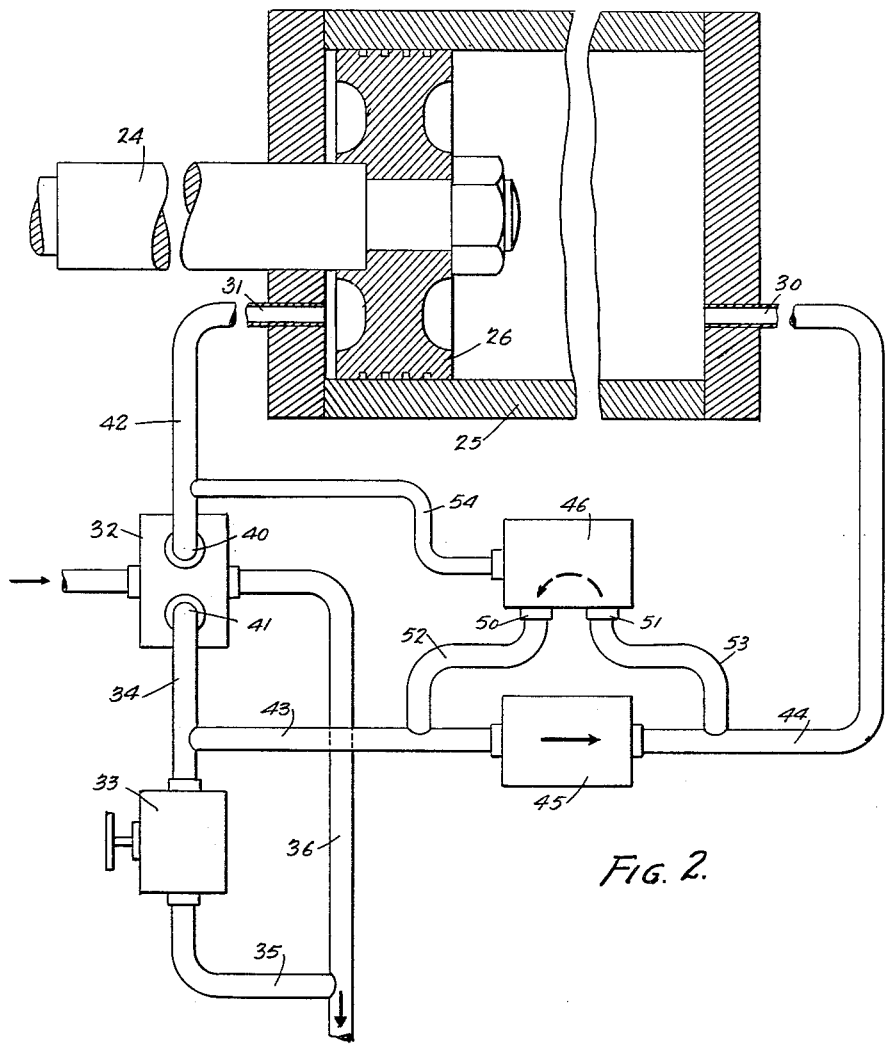
FIG. 2 is a similar view of another portion of the apparatus shown in FIG. 1.

Referring to the drawings, our invention is shown as being used on a somewhat conventional injection molding device comprising a pair of dies 10 and 11 carried, respectively, by a movable platen 12 and a stationary platen 13. Suitable means (not shown) are provided for opening and closing the dies. Arranged behind the stationary platen is the heating cylinder 14 having the usual electrical heating bands 15 and 16. The cylinder is formed with a material cavity 20 in which a material spreader 21 is disposed. A ram cylinder 22 is arranged behind the heating cylinder and slidably mounted therein is the injection ram 23 of the apparatus. This ram is carried by the piston rod 24 of a hydraulic cylinder 25, within which is mounted a piston 26. The usual material feed chute 27 is provided, whereby an intermittent charge of thermoplastic material is fed to the heating cylinder. The hydraulic cylinder is provided with a combined hydraulic fluid inlet and outlet pipe 30 at one end and a similar pipe 31 at the opposite end. As is customary in molding apparatus of this type, hydraulic fluid under pressure is supplied to the hydraulic cylinder through a solenoid-operated 4-way valve 32 shown in diagrammatic manner in the drawings. A pressure regulating valve 33 is also shown as being connected to the pipe 34 coming from the valve 32. The pressure regulating valve is provided with a hydraulic fluid outlet pipe 35 which is connected to the hydraulic fluid outlet pipe 36 coming from the 4-way valve. The valves 32 and 33 are standard articles of manufacture and are not, therefore, shown or described in detail. The pipe 36 is suitably connected to the reservoir (not shown) of the system. The 4-way valve is provided with pipe connections 40 and 41, the connection 40 being in communication with the combined inlet and outlet pipe 31 of the hydraulic cylinder through a pipe 42, and the connection 41 of the valve being in communication with the combined inlet and outlet pipe 30 of the hydraulic cylinder through pipes 34, 43 and 44. Since, in carrying out our method, the pressure created by the hydraulic cylinder upon the fluid thermoplastic in the heating cylinder and in the nozzle is momentarily held before the plastic fluid is released from the nozzle, some means must be provided for holding such pressure within the hydraulic cylinder. This may be accomplished by an additional hydraulic pump (not shown) or by placing a check valve 45 between the pipe lines 43 and 44. This will prevent the hydraulic fluid under pressure in pipe 44 and in the hydraulic cylinder from returning through pipe 43. When, however, the piston is returned to its inactive position and hydraulic fluid is forced out of the rear end of the cylinder, a by-pass around check valve 45 must be provided for conveying the fluid back through the pipe 43 and through the 4-way valve 32 to the pipe 36 whence it is conducted to the reservoir. Such means may comprise a pressure-operated check valve 46 which has its connections 50 and 51 in communication with pipes 43 and 44, respectively, through pipes 52 and 53, respectively. This valve which is a standard article of manufacture is shown in diagrammatic manner for clearness of illustration. It is provided with suitable valve operating means which are actuated under pressure of the hydraulic fluid conveyed to it from the pipe 42 through pipe 54. When this valve is actuated to its open position by the pressure exerted upon the piston 26 as it is being returned to its initial position, the hydraulic fluid in the cylinder will be forced out of the combined inlet and outlet connection 30 to the 4-way valve and thence to the reservoir through the pipe 36. When there is no pressure in the pipes 42 and 54, the pressure actuating check valve will be maintained in its closed position.

The dies shown in the accompanying drawings are for making an object having a thin wall, such for instance, as a water tumbler. Carried by the die 11 is the sprue bushing 55 which is provided with an opening 56. The nozzle 60 which is carried at the forward end of the heating cylinder is relatively long and extends through an opening 61 formed in the stationary platen. The nozzle is provided with an axial bore 62 in its forward end in which is mounted the stem 58 of a nozzle valve 63. This valve is slidably mounted within the opening 62 of the nozzle and is provided with an enlarged head 64 for sealing contact with a valve seat 65 formed at the forward end of the bore 62 of the nozzle. The surface of the nozzle valve rearwardly from the valve seat is tapered so as to act as a spreader for the plastic fluid. The valve is formed with an axial passage 70 which provides the orifice for the nozzle 60 and which terminates at its inner end in a lateral opening 71. The forward end 57 of the nozzle valve is mounted within the opening 56 of the sprue bushing and is extended substantially within the mold. This end of the valve extends through an opening 59 formed in an actuating washer 73 and it is formed with a peripheral shoulder 72 for engagement with the washer. The washer is normally in contact with the rear face of the sprue bushing and together with the valve is relatively fixed with relation to the stationary platen 13 and die 11 of the mold. As clearly shown in the drawings, a space 74 is provided between the actuating washer and the forward end of the nozzle whereby, as the nozzle moves toward the stationary part of the mold, it will be forced outwardly over the valve, thus pushing the valve seat away from the valve head 64 and thereby unseating the latter and uncovering the lateral passage and permitting fluid plastic to flow therethrough and through the longitudinal passage into the mold cavity.

Figure 5:
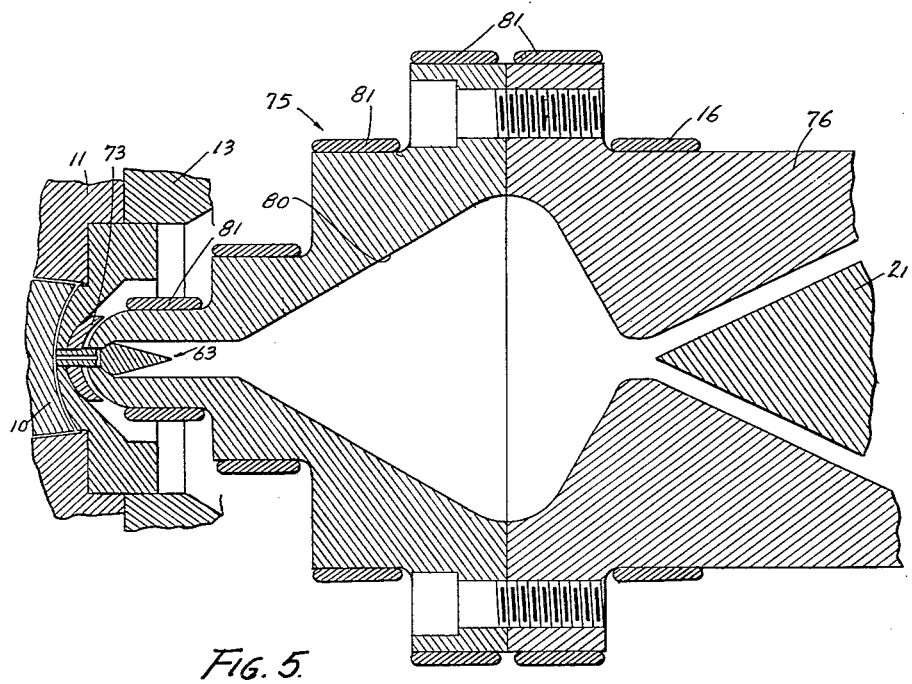
FIG. 5 is an enlarged sectional view of a modified form of device showing an accumulating chamber.

In cases where the normal volume of material contained within the heating chamber is insufficient for the production of the object at a single charge, an accumulator 75 such as that shown in FIG. 5 may be provided between the nozzle and the heating chamber. As shown in this figure, the accumulator is attached to the forward end of the heating cylinder 76, and is provided with an enlarged chamber 80 which may extend part-way into the forward end of the heating cylinder 76. Suitable heating bands 81 are provided to maintain the fluid plastic at the proper temperature. This accumulating chamber will permit the material to have a greater amount of space in which to expand and will therefore provide for the accumulation of a greater amount of fluid plastic under pressure for a single injection charge.

Figure 6:
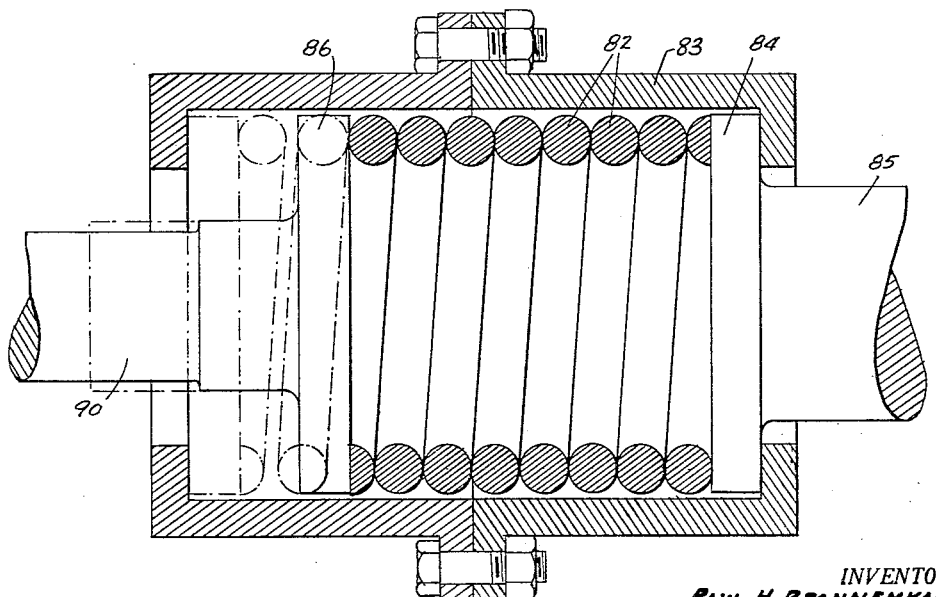
FIG. 6 is an enlarged view of a modification of the injection pressure means in the form of an apparatus for augmenting the volume of material being injected from the nozzle.

Furthermore, when it is necessary to maintain the flow of the fluid plastic through the nozzle, we may provide an auxiliary elastic medium such as a compression spring 82, as shown in FIG. 6. This spring is mounted within a floating casing 83 and has one end bearing against a flange 84 carried by the piston rod 85 and its opposite end bearing against a flange 86 carried by the injection ram 90. The spring in this figure is shown under compression and as being moved forwardly during the injection stroke of the injection ram. When the piston, causing movement of the piston rod 85, has reached the forward end of its stroke, the ram will be impelled forwardly at a greatly increased speed by the compressed spring 82 upon the opening of the nozzle valve.

Figure 3:
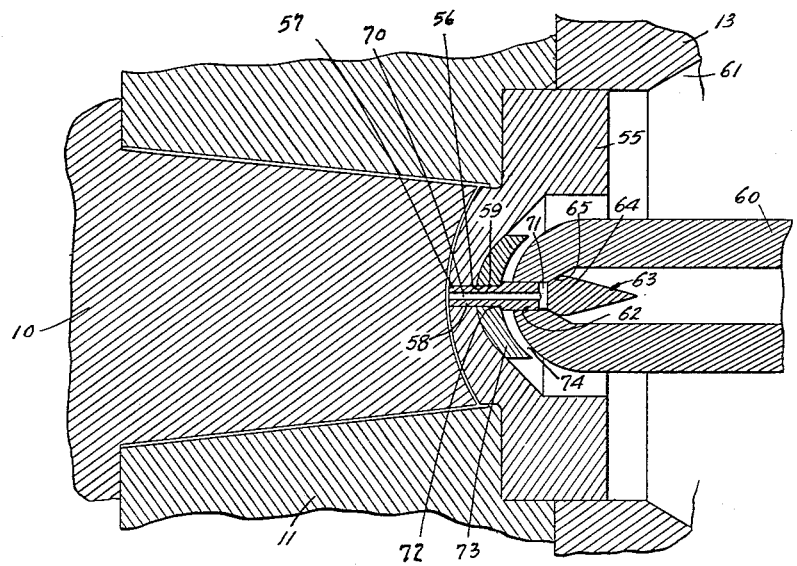
FIG. 3 is an enlarged sectional view of our improved form of nozzle showing the valve thereof in its closed position.
Figure 4:
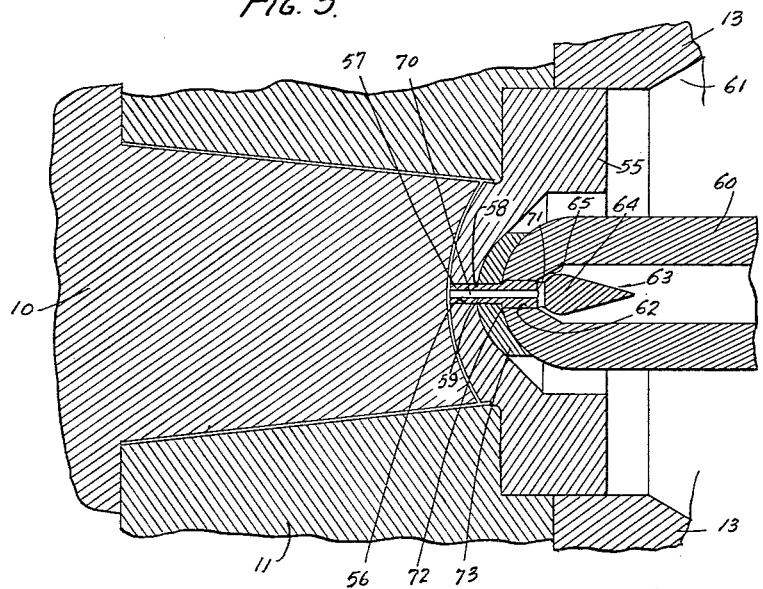
FIG. 4 is a similar view showing the nozzle valve in its open position.

In carrying out our method by the apparatus illustrated, a charge of material is fed to the injection cylinder through the feed chute 27 when the ram 23 has been withdrawn to its normal inactive position by the piston 26. When the piston moves forwardly on its power stroke, the feed chute is cut off and the material is forced into the heating cylinder where, through the medium of the heating bands 15 and 16, it is reduced to a fluid state. During this stage of the method, the nozzle is in the retracted position and the nozzle valve will be occupying its seat, as shown in FIG. 3, where it will be maintained during the compression period of the process. During this period, the fluid will be subjected to a predetermined pressure sufficient to compress it in the heating chamber and in the nozzle to a volume less than that at atmospheric pressure, and when the injection cycle has been reached, the nozzle will be moved axially within the sprue bushing and brought into sealing contact with the actuating washer. The peripheral shoulder 72 of the valve being maintained in contact with the actuating washer, the bore 62 of the nozzle will be moved axially on the valve, thereby closing the space 74 and moving the valve seat inwardly away from the valve. Movement of the nozzle will, therefore, expose the openings 70 and 71 and allow the fluid plastic held under expansive pressure to be instantaneously released and injected into the mold at such velocity as to completely fill the mold cavity before it can solidify. When the injection ram has been withdrawn to start another cycle of operation, movement of the nozzle away from the actuating washer will permit the nozzle valve to attain its closed position ready for another compression stroke of the ram.

From the foregoing it will be obvious that since the stem 58 of the valve extends through the opening 56 of the sprue bushing, the bore 62 of the nozzle, and the opening 59 of the actuating washer 73, leakage of the fluid through the joints between these parts will be prevented during the time the nozzle is moving toward the washer to open the valve.

While our method and apparatus have been designed primarily for molding objects having thin cross sectional areas, it is obvious that the method and apparatus are adaptable to the manufacture of all types of injection molded plastic items.

From the foregoing, it will be obvious that our invention provides valve means at the injection nozzle for temporarily preventing the flow of plastic material therefrom, thereby maintaining the activating force to hold the material under compression until release, together with rapid opening means for the nozzle valve to allow the plastic material to "explode" into the mold cavity.

While we have shown the use of an actuating washer of curved shape, it is obvious that both active surfaces thereof may be substantially flat. Furthermore, if desired the washer may be omitted and the peripheral shoulder 72 of the valve so positioned that it will bear against the inner face of the sprue bushing.

These and other modifications may be made without departing from the spirit of our invention, or the scope of the appended claim; and, we do not, therefore, wish to be limited to the details herein shown and described.

What is claimed is:

In the art of injection molding a thin-walled article of thermoplastic material and having a section not more than 1/32 inch thick, the method of quickly filling the mold cavity with thermoplastic material, comprising the steps of compressing a confined body of heated and fluidized thermoplastic material to reduce its volume whereby expansive energy is stored in the body of compressed material due to its inherent elasticity, and suddenly establishing communication between the mold cavity and the body of compressed material to utilize the expansive energy stored in such material by its precompression to explode a portion of the material into the mold cavity.

References Cited in the file of this patent

UNITED STATES PATENTS

| | | |
|---|---|---|
| 2,318,031 | Tucker | May 4, 1943 |
| 2,359,152 | Pryor et al. | Sept. 26, 1944 |
| 2,359,839 | Goessling | Oct. 10, 1944 |
| 2,478,013 | Roddy | Aug. 2, 1949 |
| 2,612,655 | Mathues | Oct. 7, 1952 |
| 2,696,640 | Wienand | Dec. 14, 1954 |

FOREIGN PATENTS

| | | |
|---|---|---|
| 1,030,255 | France | Mar. 11, 1953 |
| 644,695 | Germany | May 11, 1937 |